US012500337B2

(12) United States Patent
Li et al.

(10) Patent No.: US 12,500,337 B2
(45) Date of Patent: Dec. 16, 2025

(54) STRIPLINE WIPER-TYPE PHASE SHIFTER FOR A BASE STATION ANTENNA

(71) Applicant: Outdoor Wireless Networks LLC, Claremont, NC (US)

(72) Inventors: YueMin Li, Jiangsu (CN); Chao Wu, Jiangsu (CN); Haidan Tang, Jiangsu (CN); Junfeng Yu, Jiangsu (CN)

(73) Assignee: OUTDOOR WIRELESS NETWORKS LLC, Richardson, TX (US)

(*) Notice: Subject to any disclaimer, the term of this patent is extended or adjusted under 35 U.S.C. 154(b) by 758 days.

(21) Appl. No.: 17/756,455

(22) PCT Filed: Nov. 18, 2020

(86) PCT No.: PCT/US2020/061023
§ 371 (c)(1),
(2) Date: May 25, 2022

(87) PCT Pub. No.: WO2021/108182
PCT Pub. Date: Jun. 3, 2021

(65) Prior Publication Data

US 2023/0307831 A1 Sep. 28, 2023

Related U.S. Application Data

(60) Provisional application No. 62/940,283, filed on Nov. 26, 2019.

(51) Int. Cl.
*H01Q 3/32* (2006.01)
*H01Q 1/24* (2006.01)

(52) U.S. Cl.
CPC ............... *H01Q 3/32* (2013.01); *H01Q 1/246* (2013.01)

(58) Field of Classification Search
CPC ........... H01Q 3/32; H01Q 1/246; H01P 1/184
See application file for complete search history.

(56) References Cited

U.S. PATENT DOCUMENTS

2006/0077098 A1 4/2006 Zimmerman
2006/0273864 A1 12/2006 Zimmerman et al.
(Continued)

FOREIGN PATENT DOCUMENTS

JP 4864340 B2 * 2/2012
JP 2015091059 A 5/2015
WO WO-2015068409 A1 * 5/2015 ............... H01Q 1/44

OTHER PUBLICATIONS

Glossary of Terms—PEM® Fastening Products, PennEngineering, https://www.pemnet.com/resources/glossary-of-terms/, 31 pages , accessed Jan. 22, 2025 (Year: 2025).*
(Continued)

*Primary Examiner* — Robert W Hodge
*Assistant Examiner* — Fred H Mull
(74) *Attorney, Agent, or Firm* — Myers Bigel, P.A.

(57) ABSTRACT

An apparatus includes a housing comprising a first ground plane surface and a second ground plane surface and a wiper-type phase shifter within the housing that is electrically coupled to a first plurality of conductive lines and a second plurality of conductive lines, the wiper-type phase shifter, the first plurality of conductive lines, and the second plurality of conductive lines being separated from the first ground plane surface and the second ground plane surface by a dielectric material.

15 Claims, 10 Drawing Sheets

(56) References Cited

U.S. PATENT DOCUMENTS

| | | | |
|---|---|---|---|
| 2014/0320371 | A1 | 10/2014 | Iso et al. |
| 2018/0316075 | A1 | 11/2018 | Liao et al. |

OTHER PUBLICATIONS

International Search Report and Written Opinion corresponding to PCT/US2020/061023; dated Mar. 11, 2021 (10 pages).

* cited by examiner

STRIPLINE WIPER-TYPE PHASE SHIFTER FOR A BASE STATION ANTENNA

CROSS-REFERENCE TO RELATED APPLICATION

The present application is a 35 U.S.C. § 371 national stage application of PCT Application No. PCT/US2020/061023, filed on Nov. 18, 2020, which itself claims priority to U.S. Provisional Patent Application Ser. No. 62/940,283, filed Nov. 26, 2019, the entire contents of which are incorporated by reference herein as if set forth in their entireties.

FIELD OF THE INVENTION

The inventive concepts described herein relate generally to communication systems, and, more particularly, phase shifters used in wireless base station antenna assemblies.

BACKGROUND

Base station antennas for wireless communication systems may transmit radio frequency (RF) signals over long distances. A base station antenna may have a characteristic radiation pattern that defines the desired direction for transmitting/receiving signals. Early base station antennas could be configured to have a fixed radiation pattern by means of mechanical adjustments. When the antenna was installed, a technician would configure the antenna to have a desired pattern, for example, by manually adjusting the phase of each feed element of the antenna. However, reconfiguring an antenna after deployment, such as to account for changed environmental conditions, may be difficult, expensive and time-consuming.

More recently, base station antennas and related positioning systems have been developed that allow an antenna position to be configurable in the field through remote electro-mechanical control. For example, antenna systems have been developed for which settings such as the down tilt angle, beam width, and/or azimuth of the antenna are remotely controllable. Such antennas may be referred to as remote electrical tilt (RET) antennas. RET antennas allow wireless network operators to remotely control the beam attributes of the antenna through the use of electromechanical sensors and actuators. Typically, the RET antenna beam attributes are adjusted using motors or actuators according to specifications promulgated by the Antenna Interface Standards Group (AISG).

One way to control the beam attributes of a base station antenna is to adjust the phase for RF signals transmitted to and received from the radiating elements of an antenna. Referring to FIG. 1, a rotating wiper-type phase shifter 120 may be implemented with first and second printed circuit boards (PCBs). For example, the first PCB may include a stationary PCB 122, and the second PCB may include a rotatable wiper PCB 124.

The position of the rotatable wiper PCB 124 is controlled by the position of a linkage shaft 128 that is coupled to the rotatable wiper PCB 124 via a mechanical linkage. A position sensor 150 may be provided on the rotatable wiper PCB 124 to detect the position of the rotatable wiper PCB 124.

The stationary PCB 122 includes a plurality of transmission line traces 126, 128. The transmission line traces 126, 128 are generally arcuate. The transmission line traces 126, 128 may be disposed in a serpentine pattern to achieve a longer effective length. In the example illustrated in FIG. 1 there are two transmission line traces 126, 128 on the stationary PCB 122, one transmission line trace 126 being disposed along an outer circumference of a PCB 122, and one transmission line trace 128 being disposed on a shorter radius concentrically within the outer transmission line trace 126. A third transmission line trace 129 connects an input on the stationary PCB 122 to an unshifted output.

The stationary PCB 122 may include one or more input traces 140 leading from an input pad 142 near an edge of the stationary PCB 122 to the position where the pivot of the wiper PCB 124 is located. It will be understood that the use of "input" and "output" herein refer to the radio frequency signal path of transmitted signals. Radio frequency signals received by the antenna flow in the reverse direction. Electrical signals on an input trace 140 are coupled to the wiper PCB 124 and to the third transmission line 129. The wiper PCB 124 couples the electrical signals to the transmission line traces 126, 128. Transmission line traces 126, 128, 129 may be coupled to output pads 144 to which respective coaxial cables may be connected. As the wiper PCB 124 moves, an electrical length from the wiper PCB 124 to each radiating element served by the transmission lines 126, 128 changes. For example, as the wiper PCB 124 moves to shorten the electrical length from the input transmission line trace 140 to a first radiating element, the electrical length from the input transmission line trace end to a second radiating element increases by a corresponding amount.

A second rotating wiper-type phase shifter 120*a* may be provided alongside the first rotating wiper-type phase shifter 120*a*. The second rotating wiper-type phase shifter 120*a* is connected to separate transmission lines 116*a* and inputs 111*a*. The second rotating wiper-type phase shifter 120*a* may be controlled by the same linkage shaft.

SUMMARY

According to some embodiments of the inventive concept, an apparatus comprises a housing comprising a first ground plane surface and a second ground plane surface and a wiper-type phase shifter within the housing that is electrically coupled to a first plurality of conductive lines and a second plurality of conductive lines, the wiper-type phase shifter, the first plurality of conductive lines, and the second plurality of conductive lines being separated from the first ground plane surface and the second ground plane surface by a dielectric material.

In other embodiments of the inventive concept, the dielectric material is air.

In still other embodiments of the inventive concept, the first ground plane surface comprises a first plurality of openings formed therein associated with the first plurality of conductive lines, respectively, and the first ground plane surface comprises a second plurality of openings formed therein associated with the second plurality of conductive lines, respectively.

In still other embodiments of the inventive concept, the apparatus further comprises a first plurality of cables electrically coupled to the first plurality of conductive lines at a first plurality of connection points, respectively, the first plurality of connection points being exposed by the first plurality of openings, and a second plurality of cables electrically coupled to the second plurality of conductive lines at a second plurality of connection points, respectively, the second plurality of connection points being exposed by the second plurality of openings.

In still other embodiments of the inventive concept, the first plurality of cables comprises a first plurality of inner conductors and a first plurality of outer conductors, respectively; the second plurality of cables comprises a second plurality of inner conductors and a second plurality of outer conductors, respectively; the first plurality of inner conductors are electrically coupled to the first plurality of conductive lines at the first plurality of connection points, respectively; the second plurality of inner conductors are electrically coupled to the second plurality of conductive lines at the second plurality of connection points, respectively; the first plurality of outer conductors are electrically coupled to the housing; and the second plurality of outer conductors are electrically coupled to the housing.

In still other embodiments of the inventive concept, the housing comprises a first plurality of self-clinching pins and a second plurality of self-clinching pins. The first plurality of outer conductors are electrically coupled to the first plurality of self-clinching pins, respectively, and the second plurality of outer conductors are electrically coupled to the second plurality of self-clinching pins, respectively.

In still other embodiments of the inventive concept, the first plurality of cables are electrically coupled to the first plurality of conductive lines through a first side of the housing, and the second plurality of cables are electrically coupled to the second plurality of conductive lines through a second side of the housing.

In still other embodiments of the inventive concept, the housing comprises a first flange that extends from the first side, the first flange being configured to receive the first plurality of self-clinching pins, and the housing comprises a second flange that extends from the second side, the second flange being configured to receive the second plurality of self-clinching pins.

In still other embodiments of the inventive concept, the first plurality of cables extend at a first angle that is approximately perpendicular with respect to the first side of the housing, and the second plurality of cables extend at a second angle that is approximately perpendicular with respect to the second side of the housing.

In still other embodiments of the inventive concept, the first plurality of cables and the second plurality of cables are electrically coupled to the first plurality of conductive lines and the second plurality of conductive lines, respectively, through a side of the housing.

In still other embodiments of the inventive concept, the housing comprises a flange that extends from the side, the flange being configured to receive the first plurality of self-clinching pins and the second plurality of self-clinching pins.

In still other embodiments of the inventive concept, the first plurality of cables extend at a first oblique angle with respect to the side of the housing in a first direction, the second plurality of cables extend at a second oblique angle with respect to the side of the housing in a second direction, and the first and second directions do not intersect.

In still other embodiments of the inventive concept, the wiper-type phase shifter is a first wiper-type phase shifter, the housing further comprises a third ground plane surface, the second ground plane surface being between the first ground plane surface and the third ground plane surface, and the apparatus further comprises: a second wiper-type phase shifter within the housing that is electrically coupled to a third plurality of conductive lines and a fourth plurality of conductive lines, the second wiper-type phase shifter, the third plurality of conductive lines, and the fourth plurality of conductive lines being separated from the third ground plane surface and the second ground plane surface by the dielectric material.

In still other embodiments of the inventive concept, the third ground plane surface comprises a third plurality of openings formed therein associated with the third plurality of conductive lines, respectively, and the third ground plane surface comprises a fourth plurality of openings formed therein associated with the fourth plurality of conductive lines, respectively.

In still other embodiment of the inventive concept, that apparatus further comprises a third plurality of cables electrically coupled to the third plurality of conductive lines at a third plurality of connection points, respectively, the third plurality of connection points being exposed by the third plurality of openings, and a fourth plurality of cables electrically coupled to the fourth plurality of conductive lines at a fourth plurality of connection points, respectively, the fourth plurality of connection points being exposed by the fourth plurality of openings.

In still other embodiments of the inventive concept, the third plurality of cables comprises a third plurality of inner conductors and a third plurality of outer conductors, respectively; the fourth plurality of cables comprises a fourth plurality of inner conductors and a fourth plurality of outer conductors, respectively; the third plurality of inner conductors are electrically coupled to the third plurality of conductive lines at the third plurality of connection points, respectively; the fourth plurality of inner conductors are electrically coupled to the fourth plurality of conductive lines at the fourth plurality of connection points, respectively; the third plurality of outer conductors are electrically coupled to the housing; and the fourth plurality of outer conductors are electrically coupled to the housing.

In still other embodiments of the inventive concept, the housing comprises a third plurality of self-clinching pins and a fourth plurality of self-clinching pins, the third plurality of outer conductors are electrically coupled to the third plurality of self-clinching pins, respectively, and the fourth plurality of outer conductors are electrically coupled to the fourth plurality of self-clinching pins, respectively.

In still other embodiments of the inventive concept, the first plurality of cables are electrically coupled to the first plurality of conductive lines through a first side of the housing; the third plurality of cables are electrically coupled to the third plurality of conductive lines through the first side of the housing; the second plurality of cables are electrically coupled to the first plurality of conductive lines through a second side of the housing; and the fourth plurality of cables are electrically coupled to the fourth plurality of conductive lines through a second side of the housing.

In still other embodiments of the inventive concept, the housing comprises a first flange that extends from the first side, the first flange being configured to receive the first plurality of self-clinching pins and the third plurality of self-clinching pins, and the housing comprises a second flange that extends from the second side, the second flange being configured to receive the second plurality of self-clinching pins and the fourth plurality of self-clinching pins.

In still other embodiments of the inventive concept, the first plurality of cables extend at a first angle that is approximately perpendicular with respect to the first side of the housing; the third plurality of cables extend at a third angle that is approximately perpendicular with respect to the first side of the housing; the second plurality of cables extend at a second angle that is approximately perpendicular with respect to the second side of the housing; and the fourth plurality of cables extend at a fourth angle that is approximately perpendicular with respect to the second side of the housing.

In still other embodiments of the inventive concept, the first plurality of cables and the second plurality of cables are electrically coupled to the first plurality of conductive lines and the second plurality of conductive lines, respectively, through a first side of the housing, and the third plurality of cables and the fourth plurality of cables are electrically coupled to the third plurality of conductive lines and the fourth plurality of conductive lines, respectively, through a second side of the housing.

In still other embodiments of the inventive concept, the housing comprises a first flange that extends from the first side, the first flange being configured to receive the first plurality of self-clinching pins and the second plurality of self-clinching pins, and the housing comprises a second flange that extends from the second side, the second flange being configured to receive the third plurality of self-clinching pins and the fourth plurality of self-clinching pins.

In still other embodiments of the inventive concept, the first plurality of cables extend at a first oblique angle with respect to the first side of the housing in a first direction; the second plurality of cables extend at a second oblique angle with respect to the first side of the housing in a second direction; the third plurality of cables extend at a third oblique angle with respect to the second side of the housing in a third direction; the fourth plurality of cables extend in a fourth oblique angle with respect to the second side of the housing in a fourth direction; the first and second directions do not intersect and the third and fourth directions do not intersect.

In still other embodiments of the inventive concept, the wiper-type phase shifter is a first wiper-type phase shifter and the housing further comprises a third ground plane surface, the second ground plane surface being between the first ground plane surface and the third ground plane surface.

In still other embodiments of the inventive concept, the apparatus further comprises a second wiper-type phase shifter within the housing that is electrically coupled to a third plurality of conductive lines and a fourth plurality of conductive lines, the second wiper-type phase shifter, the third plurality of conductive lines, and the fourth plurality of conductive lines being separated from the third ground plane surface and the second ground plane surface by the dielectric material.

In still other embodiments of the inventive concept, the first plurality of conductive lines extend a first plurality of lengths, respectively, within the housing such that terminal ends of the first plurality of conductive lines are configured to align with first connection points for an antenna feed board, respectively, and the second plurality of conductive lines extend a second plurality of lengths, respectively, within the housing such that terminal ends of the second plurality of conductive lines are configured to align with second connection points for the antenna feed board, respectively.

In some embodiments of the inventive concept, an antenna assembly comprises a plurality of radiating elements and a feed network coupled to the plurality of radiating elements, the feed network comprising a plurality of phase shifters, each of the plurality of phase shifters comprising: a housing comprising a first ground plane surface, a second ground plane surface, and a third ground plane surface, the second ground plane surface being between the first ground plane surface and the third ground plane surface; a first wiper-type phase shifter within the housing that is electrically coupled to a first plurality of conductive lines and a second plurality of conductive lines, the first wiper-type phase shifter, the first plurality of conductive lines, and the second plurality of conductive lines being separated from the first ground plane surface and the second ground plane surface by a dielectric material; and a second wiper-type phase shifter within the housing that is electrically coupled to a third plurality of conductive lines and a fourth plurality of conductive lines, the second wiper-type phase shifter, the third plurality of conductive lines, and the fourth plurality of conductive lines being separated from the third ground plane surface and the second ground plane surface by the dielectric material.

In further embodiments of the inventive concept, at least a portion of the plurality of phase shifters are arranged adjacent one another in a direction that is substantially perpendicular to the first, second, and third ground plane surfaces.

In still further embodiments of the inventive concept, at least a portion of the plurality of phase shifters are arranged adjacent one another in a direction that is substantially parallel with a planes defined by the first, second, and third ground plane surfaces, respectively.

In some embodiments of the inventive concept, an antenna assembly comprises a plurality of radiating elements and a feed network coupled to the plurality of radiating elements, the feed network comprising a plurality of phase shifters, each of the plurality of phase shifters comprising: a housing comprising a first ground plane surface, a second ground plane surface, and a third ground plane surface, the second ground plane surface being between the first ground plane surface and the third ground plane surface. A first one of the plurality of phase shifters comprises a first wiper-type phase shifter within the housing that is electrically coupled to a first plurality of conductive lines and a second plurality of conductive lines, the first wiper-type phase shifter, the first plurality of conductive lines, and the second plurality of conductive lines being separated from the first ground plane surface and the second ground plane surface by a dielectric material. A second one of the plurality of phase shifters comprises a second wiper-type phase shifter within the housing that is electrically coupled to a third plurality of conductive lines and a fourth plurality of conductive lines, the second wiper-type phase shifter, the third plurality of conductive lines, and the fourth plurality of conductive lines being separated from the third ground plane surface and the second ground plane surface by the dielectric material.

In other embodiments of the inventive concept, the antenna assembly further comprises a first plurality of cables electrically coupled to the first plurality of conductive lines, respectively; a second plurality of cables electrically coupled to the second plurality of conductive lines, respectively; a third plurality of cables electrically coupled to the third plurality of conductive lines, respectively; and a fourth plurality of cables electrically coupled to the fourth plurality of conductive lines, respectively. The first one of the plurality of phase shifters and the second one of the plurality of phase shifters are arranged adjacent one another in a direction that is substantially parallel with a planes defined by the first, second, and third ground plane surfaces, respectively, and the first plurality of cables and the second plurality of cables extend from a first side of the housing of the first one of the plurality of phase shifters. The third plurality of cables and the fourth plurality of cables extend from a second side of the housing of the second one of the plurality of phase shifters, and the first side of the housing of the first one of the plurality of phase shifters faces the second side of the housing of the second one of the plurality of phase shifters.

Other apparatus, systems, assemblies, and/or articles of manufacture, according to embodiments of the inventive concept, will be or become apparent to one with skill in the art upon review of the following drawings and detailed description. It is intended that all such additional apparatus, systems, assemblies, and/or articles of manufacture be included within this description, be within the scope of the present inventive concept, and be protected by the accompanying claims.

DETAILED DESCRIPTION

In the following detailed description, numerous specific details are set forth to provide a thorough understanding of embodiments of the present disclosure. However, it will be understood by those skilled in the art that embodiments of the present invention may be practiced without these specific details. In some instances, well-known methods, procedures, components, and circuits have not been described in detail so as not to obscure the present disclosure. Aspects described with respect to one embodiment may be incorporated in different embodiments although not specifically described relative thereto. That is, all embodiments and/or features of any embodiments can be combined in any way and/or combination.

Some embodiments of the inventive concept stem from a desire to improve the performance of a phase shifter for a wireless base station antenna at a reasonable cost. One approach that may be used is to change the design of a phase shifter from a printed circuit board (PCB) based design to a stripline design. A stripline circuit uses a conductor that is between two ground planes and is separated therefrom by a dielectric insulating material. The physical form and dimensions of the conductor, the thickness of the dielectric, and the relative permittivity of the dielectric determine the characteristic impedance of the conductor, which may be viewed as a transmission line. A phase shifter embodied using stripline technology may provide lower insertion loss, which can improve the gain of an antenna, while the cost of the stripline implementation may be only marginally more than a PCB based implementation.

Figure 1:
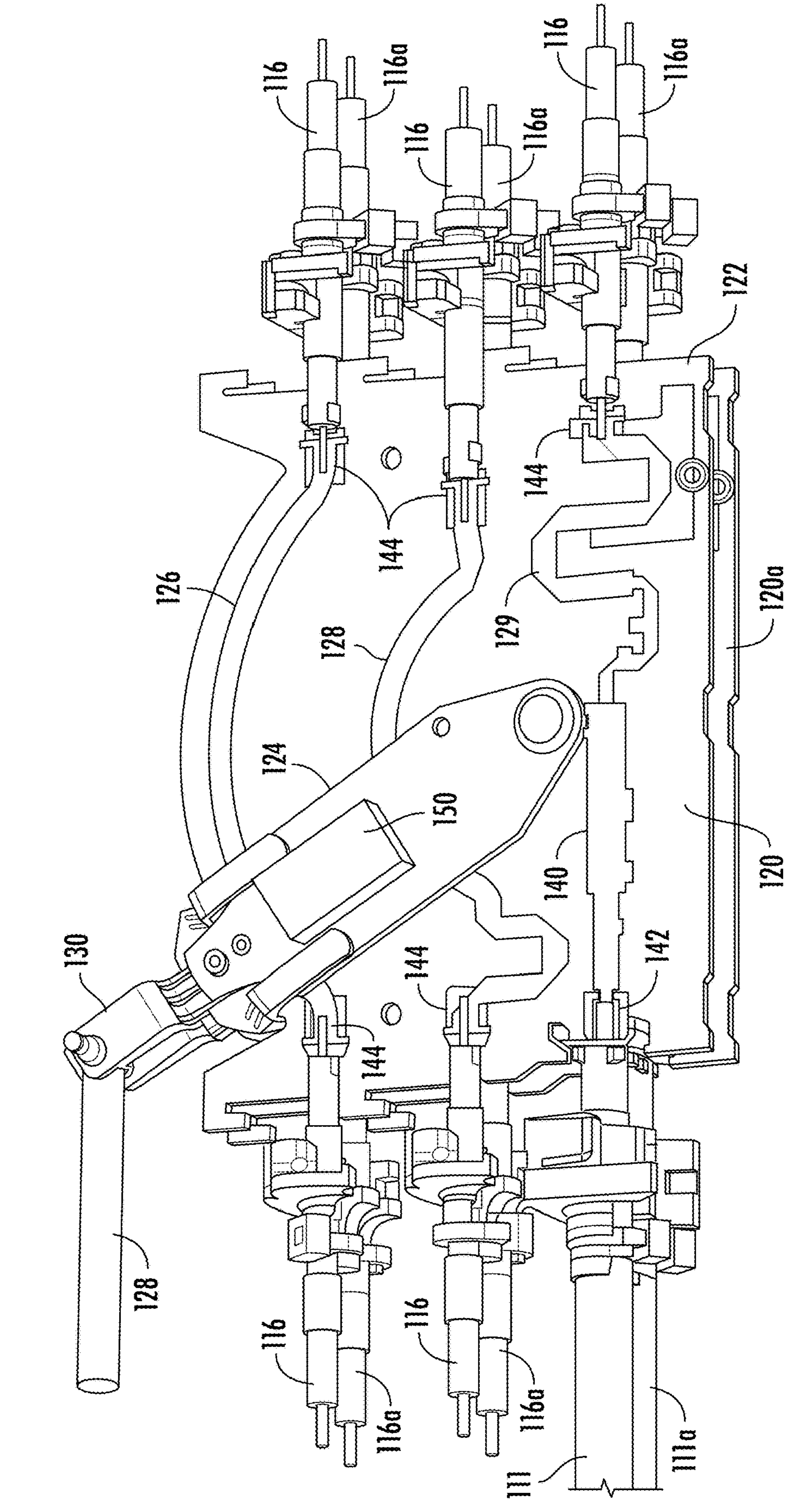
FIG. 1 (PRIOR ART)
FIG. 1 is an example of a conventional printed circuit board (PCB) based phase shifter.
Figure 2:
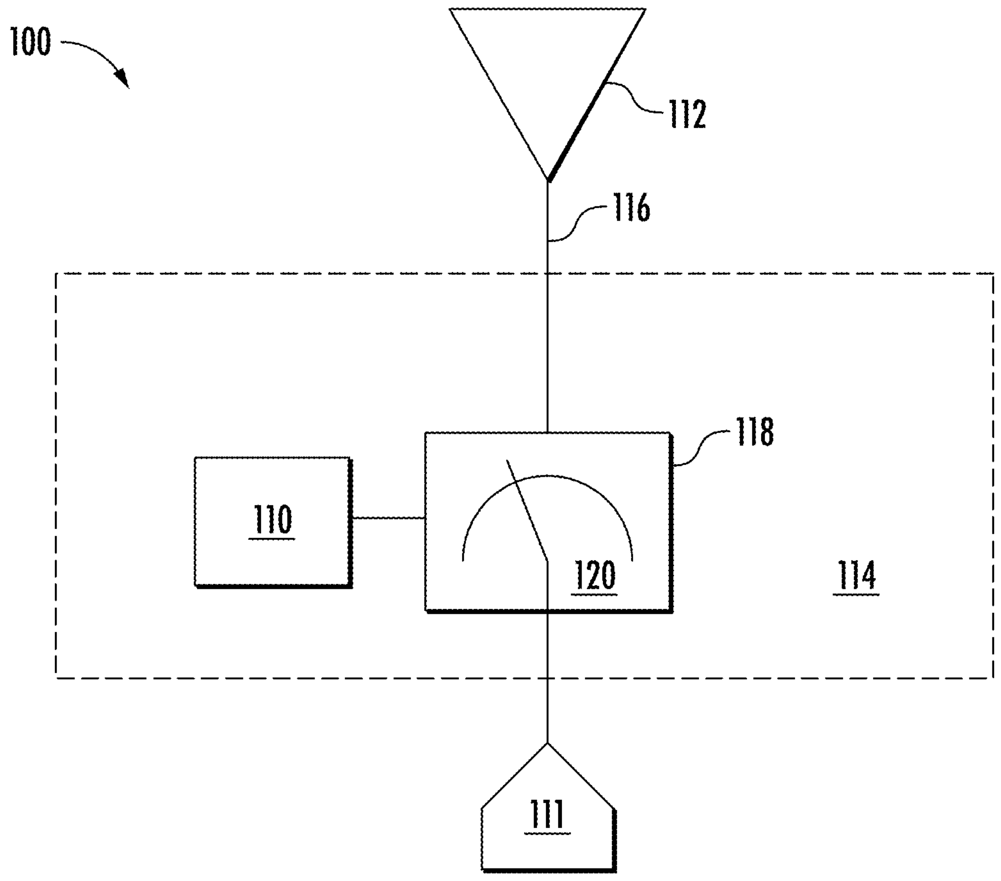
FIG. 2 is a block diagram of an antenna including a feed network and a stripline based phase shifter according to some embodiments of the inventive concept.

Referring to FIG. 2, a base station antenna array 100 may include an input 111, a plurality of radiating elements 112, e.g., a column of radiating elements 112, and a feed network 114, which couples the input 111 to the column of radiating elements 112. The feed network 114 may include a plurality of transmission lines 116 and one or more variable elements 118. The transmission lines 116 have nominal impedance, which may be selected to match an impedance of an RF line that couples the antenna array 100 to a Low Noise Amplifier (LNA) (not shown). The transmission lines 116 may be implemented in a variety of ways, in accordance with various embodiments of the inventive concept, such as by using microstrip transmission lines, coaxial cables, or other impedance-controlled transmission media. The variable elements 118 may include one or more phase shifters, power dividers, a combination of the two, or another type of variable element.

In some embodiments of the inventive concept, the variable elements 118 may include rotating stripline wiper-type phase shifters 120 connected to the transmission lines 116 and the input 111. The phase shift imparted by the stripline phase shifter 120 may be controlled by a mechanical positioning system 110 that physically changes the position of the rotating wiper in the stripline phase shifter 120. Typically, there are two phase shifters per column of radiating elements corresponding to the dual polarity of each radiating element. Thus, the input 111 may represent two inputs—one input for each phase shifter.

Figure 3:
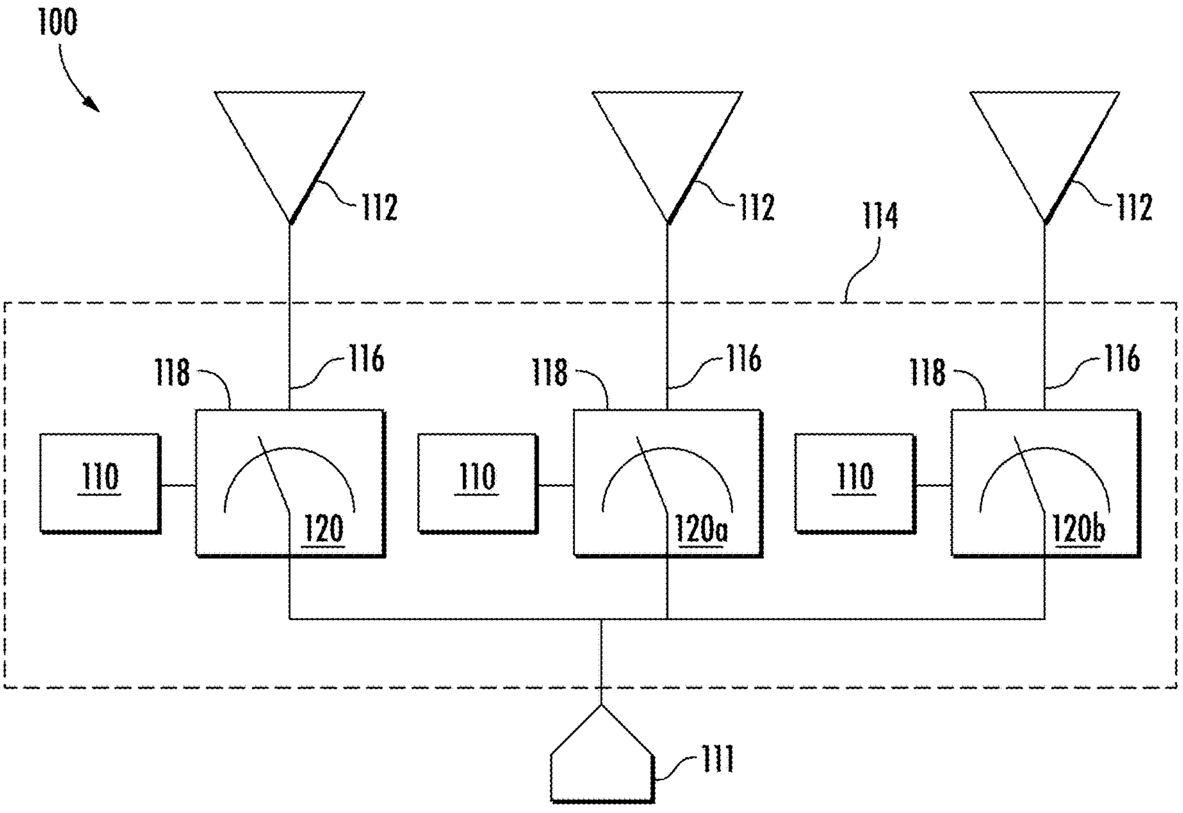
FIG. 3 is a block diagram of an antenna including a feed network and a multiple stripline based phase shifters according to some embodiments of the inventive concept.

Referring to FIG. 3, a second pair of rotating stripline wiper-type phase shifters 120*a* may be provided alongside the first pair of rotating stripline wiper-type phase shifters 120. The second pair of rotating stripline wiper-type phase shifters 120*a* is connected to separate transmission lines 116 and inputs 111 associated with another column of radiating elements 112. As shown in FIG. 3, a base station antenna system may include multiple pairs of stripline phase shifters

120, 120*a*, 120*b* that are controlled by a plurality of mechanical positioning systems 110. The inputs 111 may represent multiple pairs of inputs for driving respective columns of radiating elements with each radiating element in the column having a positive and negative polarity element coupled to respective phase shifters.

Figure 4:
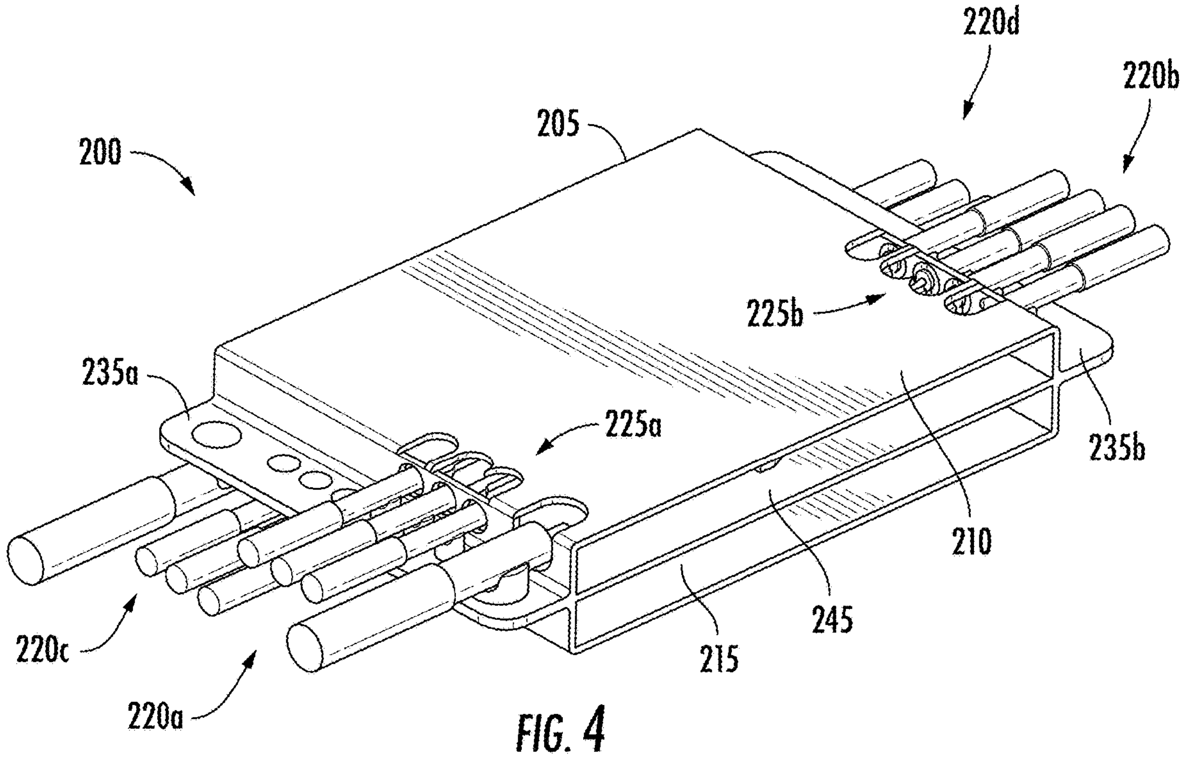
FIG. 4 is a perspective diagram of a stripline wiper-type phase shifter with cables connecting to opposing sides according to some embodiments of the inventive concept.

FIG. 4 is a perspective diagram of a stripline wiper-type phase shifter with cables connecting to opposing sides according to some embodiments of the inventive concept. As shown in FIG. 4, the stripline wiper-type phase shifter 200 includes a housing 205 having a first ground plane surface 210 and a second ground plane surface 215. The stripline wiper-type phase shifter 200 further includes a wiper-type phase shifter (see FIG. 6) within the housing between the first and second ground plane surfaces 210 and 215. The wiper-type phase shifter is separated from the first and second ground plane surfaces 210 and 215 by a dielectric material, such as air. As shown in FIG. 4, the stripline wiper-type phase shifter 200 may terminate a first plurality of cables 220*a* and a second plurality of cables 220*b* at opposite ends thereof. The first ground plane surface 210 of the housing 205 may have first openings 225*a* formed therein to facilitate electrical connections between the first plurality of cables 220*a* and a first plurality of conductive lines connected to the wiper-type phase shifter and second openings 225*b* formed therein to facilitate electrical connections between the second plurality of cables 220*b* and a second plurality of conductive lines connected to the wiper-type phase shifter. The first and second pluralities of conductive lines may be input conductive lines or output conductive lines depending on whether signals are being transmitted or received. The connections between the conductive lines and the cables are illustrated in greater detail according to some embodiments of the inventive concept in FIG. 5.

Figure 5:
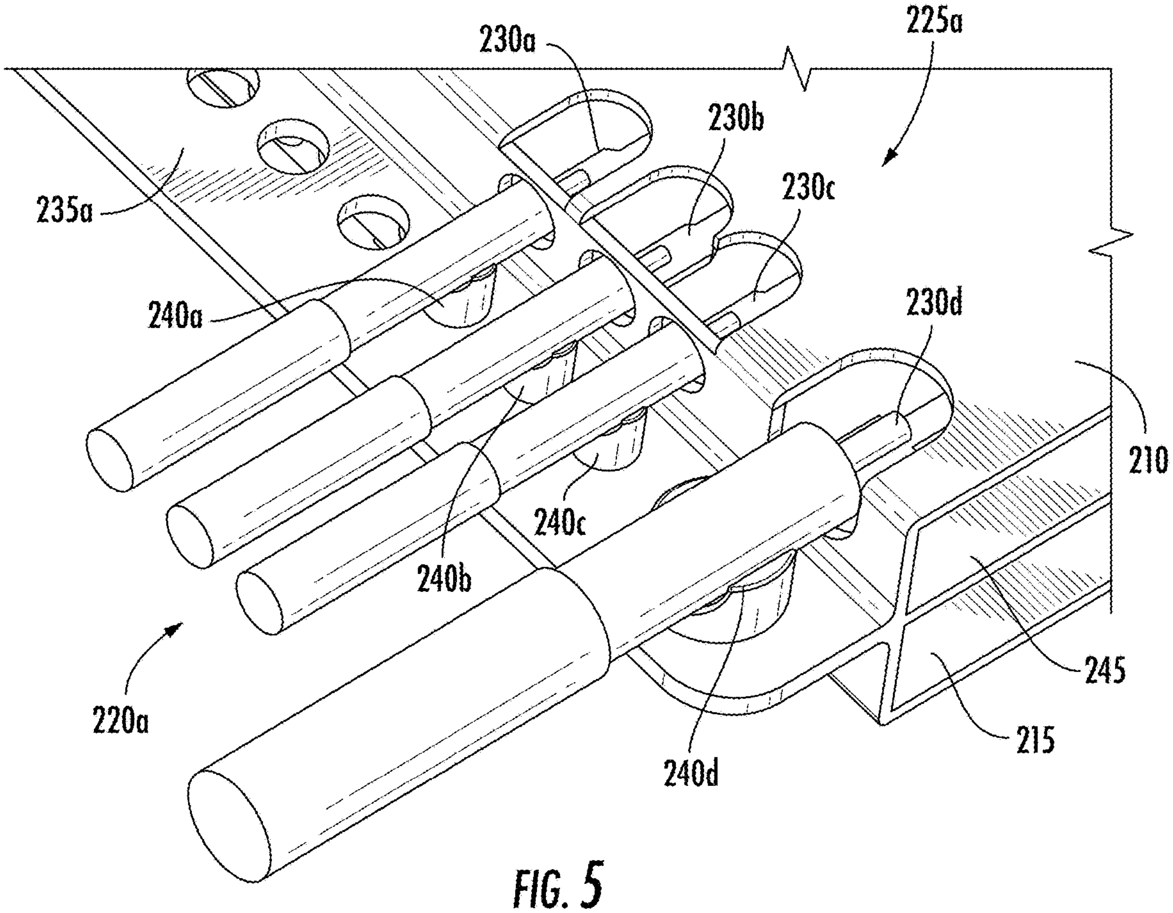
FIG. 5 is a perspective diagram of the stripline wiper-type phase shifter of FIG. 4 that illustrates connection points for the cables according to some embodiments of the inventive concept.

Referring now to FIG. 5, the first plurality of cables 220*a* are electrically coupled to the first plurality of conductive lines connected to the wiper-type phase shifter at connection points 230*a*, 230*b*, 230*c*, and 230*d*. The connections may be made using solder or other suitable form of electrically connecting the inner conductors of the cables 220*a* to the conductive lines. The housing 205 may further include a flange 235*a* that may be configured to receive a plurality of self-clinching pins 240*a*, 240*b*, 240*c*, and 240*d*. The plurality of self-clinching pins 240*a*, 240*b*, 240*c*, and 240*d* may be press-fit into the flange 235*a* according to some embodiments. The outer conductors of the first plurality of cables 220*a* may be electrically connected to the self-clinching pins 240*a*, 240*b*, 240*c*, and 240*d*, respectively using solder or other suitable form of electrically connecting the outer conductors of the cables 220*a* to the flange 235*a*. The flange 235*a* may be electrically coupled to the first or second ground planes 210, 215. In some embodiments, the entire housing 205, including the flange 235*a*, may be electrically connected, for example, through tin-plating or construction through conductive materials. In other embodiments, the housing may not include a flange 235*a* and the outer conductors of the cables 220*a* may be electrically connected, for example, to the first or second ground planes 210, 215 internal to the housing 205 or at another location on an outer surface the housing 205.

Returning to FIG. 4, the connections between the second plurality of cables 220*b* and a second plurality of conductive lines is similar to that of the first plurality of cables 220*a* and the first plurality of conductive lines including a second flange 235*b*. Furthermore, in some embodiments, the housing 205 may include a third ground plane 245, such that the second ground plane 215 divides the inner chamber of the housing 205 into separate regions. This may allow the above-described circuitry, including a second wiper-type phase shifter, to be duplicated between the third ground plane 245 and the second ground plane 215. A third plurality of cables 220*c* and a fourth plurality of cables 220*d* may be electrically connected to a third plurality of conductive lines and a fourth plurality of conductive lines of the second wiper-type phase shifter, respectively, in the same fashion as described above with respect to FIG. 5.

Figure 6:
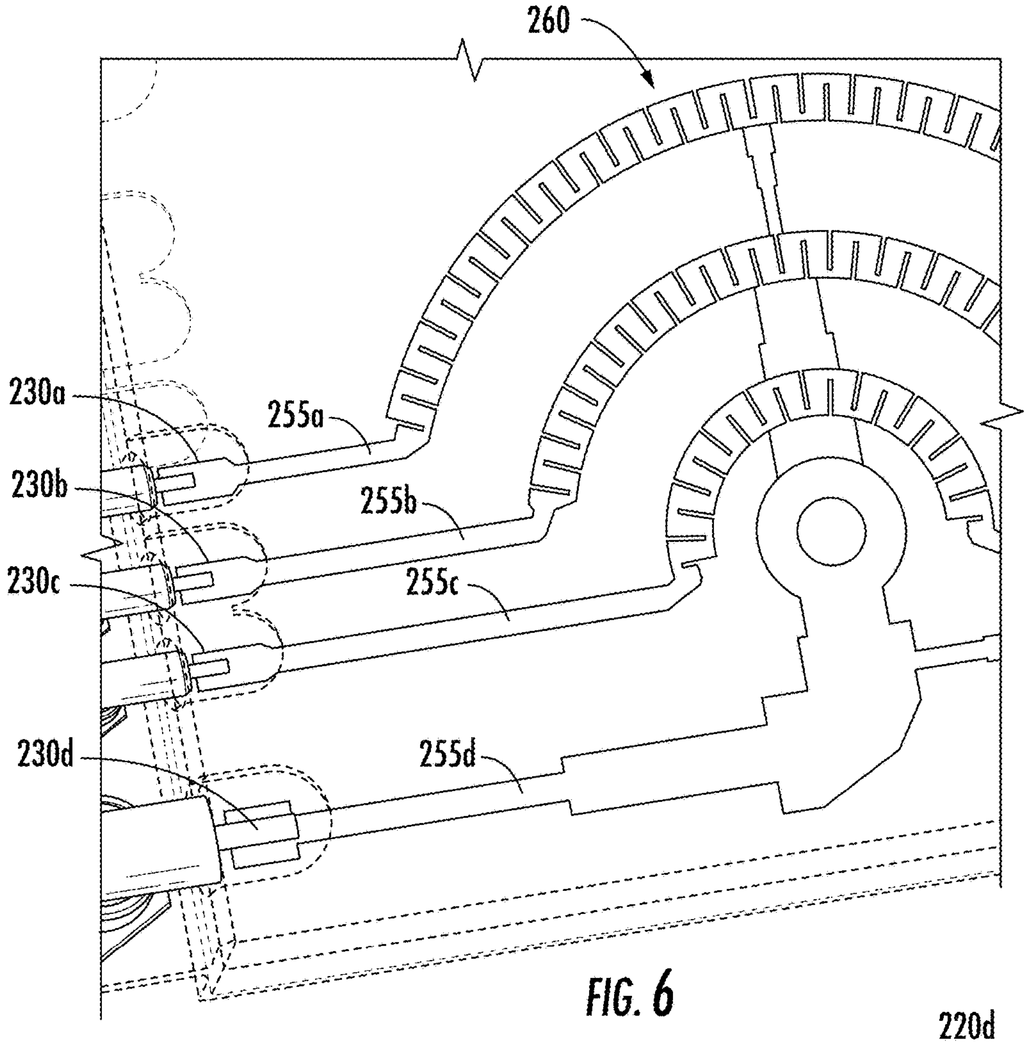
FIG. 6 is a perspective diagram of the stripline wiper-type phase shifter of FIG. 4 that shows the wiper-type phase shifter within the housing according to some embodiments of the inventive concept.

FIG. 6 is a shadow perspective diagram of the stripline wiper-type phase shifter of FIG. 4 that shows the wiper-type phase shifter within the housing 205 according to some embodiments of the inventive concept. As shown in FIG. 6, the wiper-type phase shifter 260 includes a first plurality conductive lines 255*a*, 255*b*, 255*c*, and 255*d* that are electrically connected to the first plurality of cables 220*a* at the connection points 230*a*, 230*b*, 230*c*, and 230*d*, respectively. The wiper-type phase shifter 260 further includes a second plurality of conductive lines (not shown) that are electrically coupled to the second plurality of cables 220*b*.

Figure 7:
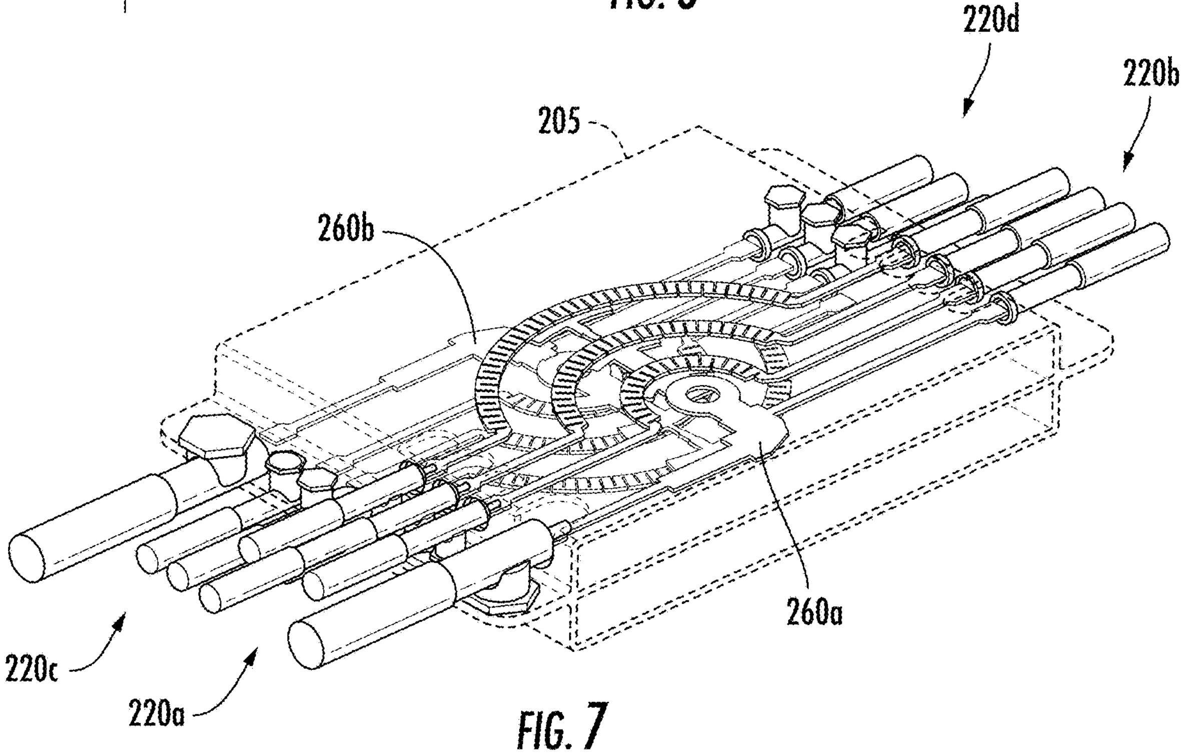
FIG. 7 is a perspective diagram that shows a pair of wiper-type phase shifters of the type shown in FIG. 4 within the housing according to some embodiments of the inventive concept.

FIG. 7 is a perspective diagram that shows a pair of wiper-type phase shifters 260*a*, 260*b* of the type shown in FIG. 4 within the housing 205 according to some embodiments of the inventive concept. As shown in FIG. 7, two wiper-type phase shifters 260*a*, 260*b* can be configured as mirror images of each other within the housing 205.

Figure 8:
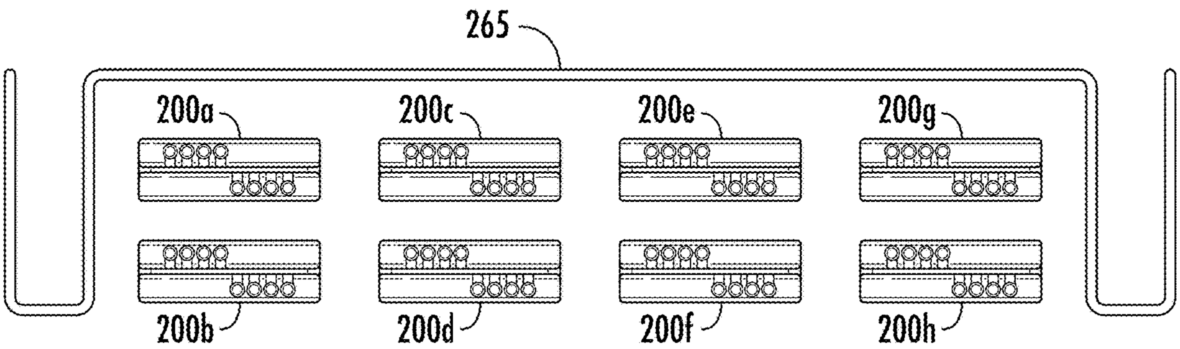
FIGS. 8 and 9 are block diagrams that illustrate arrangements of stripline wiper-type phase shifters of the types shown in FIGS. 4 and 7 in an antenna assembly according to some embodiments of the inventive concept.
Figure 9:
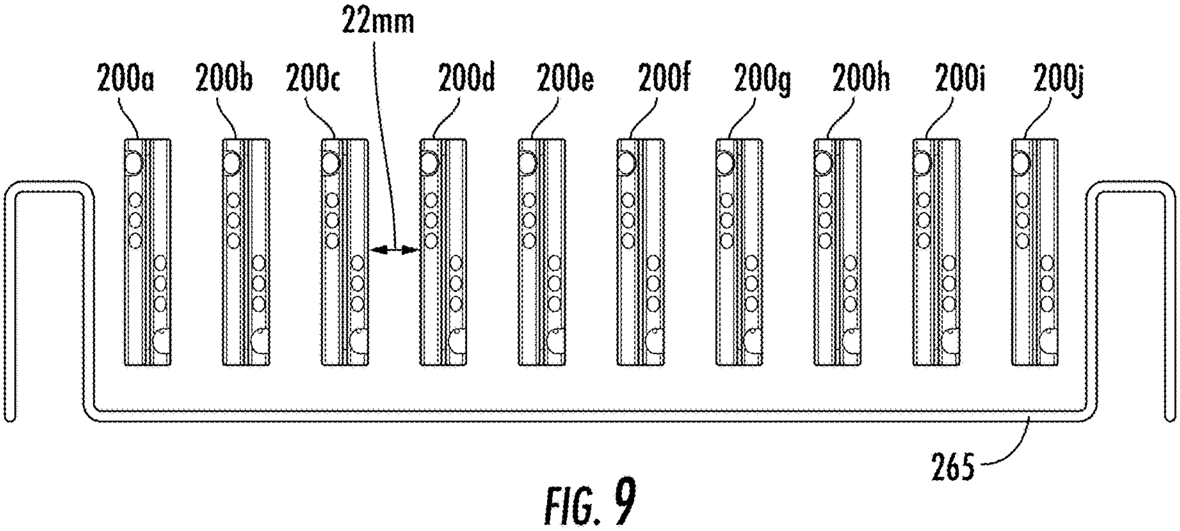

FIGS. 8 and 9 are block diagrams that illustrate arrangements of stripline wiper-type phase shifters of the types shown in FIGS. 4 and 7 in an antenna assembly according to some embodiments of the inventive concept. In some embodiments, an antenna assembly of the type described above with respect to FIGS. 2 and 3 may use stripline wiper-type phase shifters 200*a*, 200*b*, 200*c*, 200*d*, 200*e*, 200*f*, 200*g*, and 200*h* that are configured as shown in relation to a reflector 265. As shown in FIG. 8, the stripline wiper-type phase shifters 200*a*, 200*b*, 200*c*, 200*d*, 200*e*, 200*f*, 200*g*, and 200*h* may be arranged adjacent to one another horizontally, i.e., in a direction substantially parallel to the ground planes defined by the housing, and/or vertically, i.e., in a direction substantially perpendicular to the ground planes defined by the housing. In FIG. 9, the stripline wiper-type phase shifters 200*a*, 200*b*, 200*c*, 200*d*, 200*e*, 200*f*, 200*g*, 200*h*, 200*i*, and 200*j* are arranged so as to be spaced apart in a horizontal direction, but are oriented, such that the horizontal direction is substantially perpendicular to the ground planes defined by the housing. The stripline wiper-type phase shifters 200*a*, 200*b*, 200*c*, 200*d*, 200*e*, 200*f*, 200*g*, 200*h*, 200*i*, and 200*j* may be configured with a single wiper-type phase shifter or with a pair of wiper-type phase shifters in accordance with various embodiments.

Figure 10:
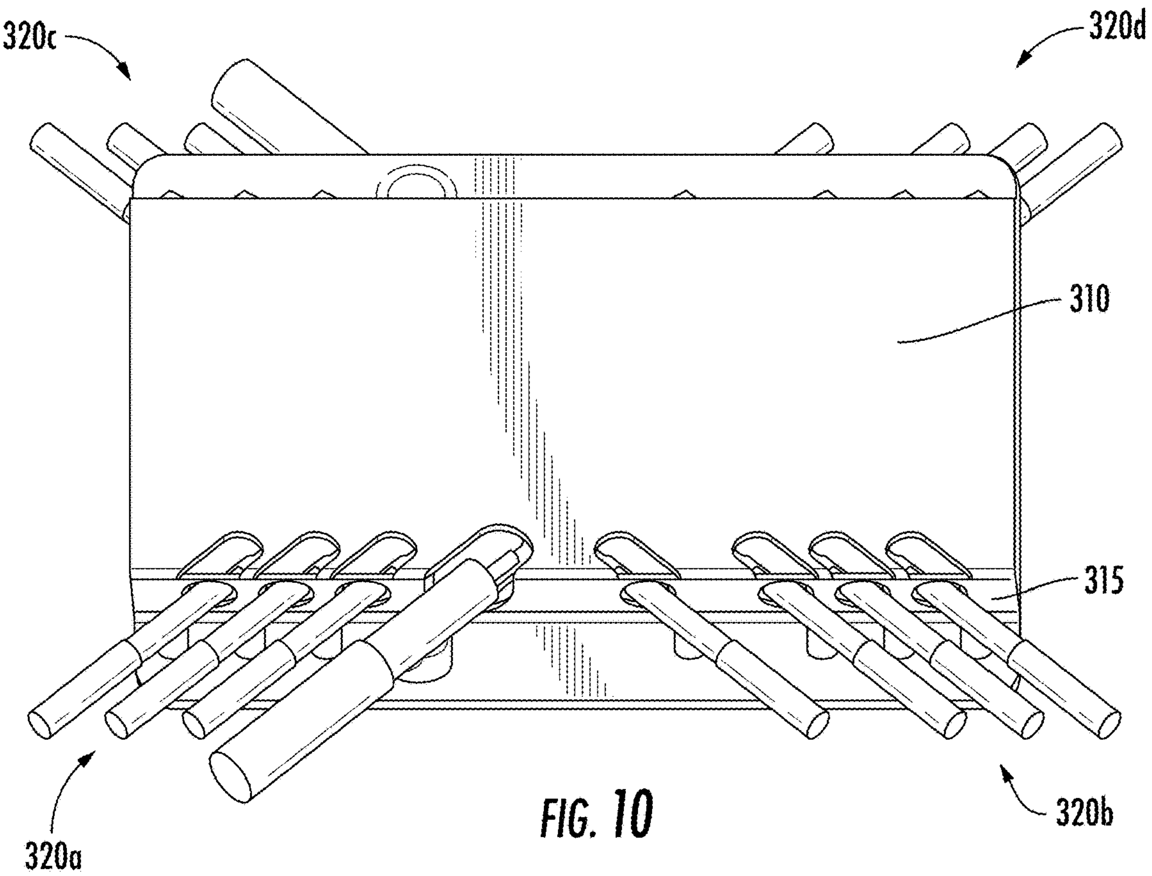
FIG. 10 is a perspective diagram of a stripline wiper-type phase shifter with cables connecting to a common side according to some embodiments of the inventive concept.

FIG. 10 is a perspective diagram of a stripline wiper-type phase shifter with cables connecting to a common side according to some embodiments of the inventive concept. The embodiments of FIGS. 10 through 13 use similar designs for the housing, ground planes, and connections between the cables and the conductive lines associated with the wiper-type phase shifters. Accordingly, their description will not be repeated in the interest of conciseness. The stripline wiper-type phase shifter 300 of FIG. 10 differs from that of the stripline wiper-type phase shifter 200 in that both a first plurality of cables 320*a* and a second plurality of cables 320*b* connect to a first plurality of conductive lines and a second plurality of conductive lines, respectively, of a wiper-type phase shifter between first and second ground planes 310, 315 on a same side of the housing 305. Similar to the stripline wiper-type phase shifter 200, the stripline wiper-type phase shifter 300 may be configured with a second wiper-type phase shifter between a third ground plane (not visible) and the second ground plane. A third plurality of cables 320*c* and a fourth plurality of cables 320*d* connect to a third plurality of conductive lines and a fourth plurality of conductive lines, respectively, of a second wiper-type phase shifter between third (not visible) and second ground planes 315 on a same side of the housing 305.

Figure 11:
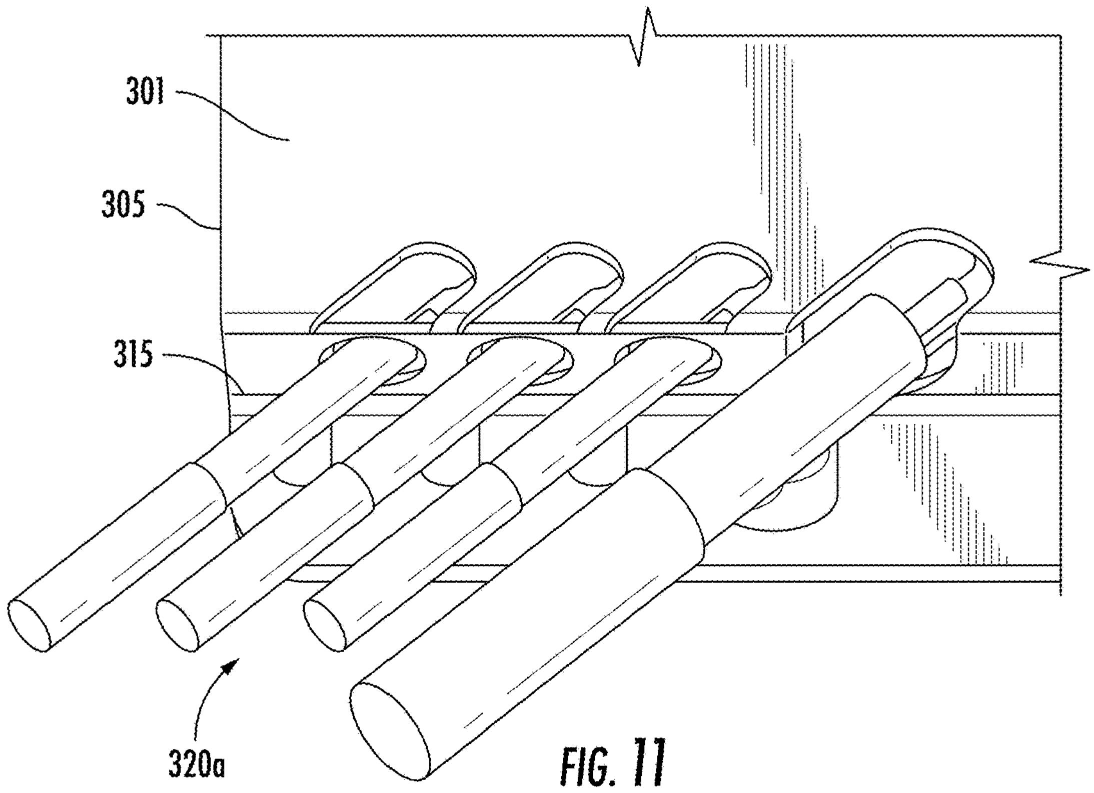
FIG. 11 is a perspective diagram of the stripline wiper-type phase shifter of FIG. 10 that illustrates connection points for the cables according to some embodiments of the inventive concept.

FIG. 11 illustrates the connection points between the first plurality of cables 320*a* and a first plurality of conductive lines of a wiper-type phase shifter in greater detail according to some embodiments of the inventive concept. The connection points between the first plurality of cables 320*a* and the first plurality of conductive lines is the same as that described above with respect to FIG. 5. The first plurality of cables 320*a*, however, differs from the first plurality of cables 220*a* in that the cables extend from the side of the housing 305 at an oblique angle. As shown in FIG. 10, each of the plurality of cables 320*a* and 320*b* extends from the side of the housing 305 at oblique angles in directions that do not intersect with one another. The oblique angle may facilitate improved cable layout in an antenna assembly.

Figure 12:
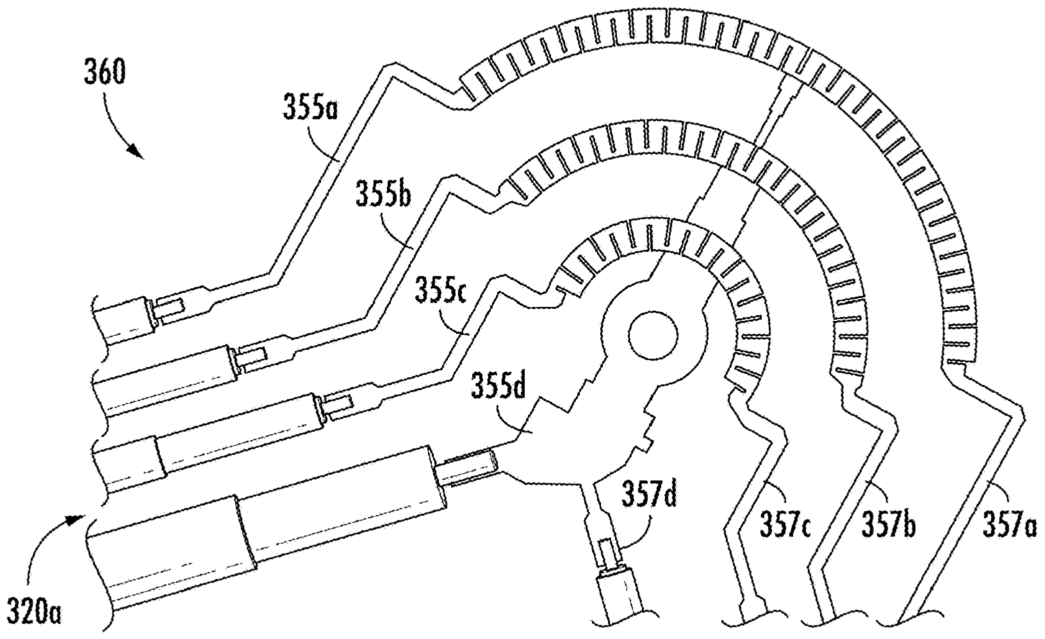
FIG. 12 is a perspective diagram of the stripline wiper-type phase shifter of FIG. 10 that shows the wiper-type phase shifter within the housing according to some embodiments of the inventive concept.

FIG. 12 is a perspective diagram of the stripline wiper-type phase shifter of FIG. 10 that shows the wiper-type phase shifter within the housing 305 according to some embodiments of the inventive concept. As shown in FIG. 12, the wiper-type phase shifter 360 includes a first plurality conductive lines 355*a*, 355*b*, 355*c*, and 355*d* that are electrically connected to the first plurality of cables 320*a* at respective connection points. In contrast to the plurality of conductive lines connected to the wiper-type phase shifter 260 shown in FIG. 6, the first plurality conductive lines 355*a*, 355*b*, 355*c*, and 355*d* along with the second plurality of conductive lines 357*b*, 357*c*, and 357*d* (357*a* not shown) are oriented so as to extend towards a same side of the housing 305.

Figure 13:
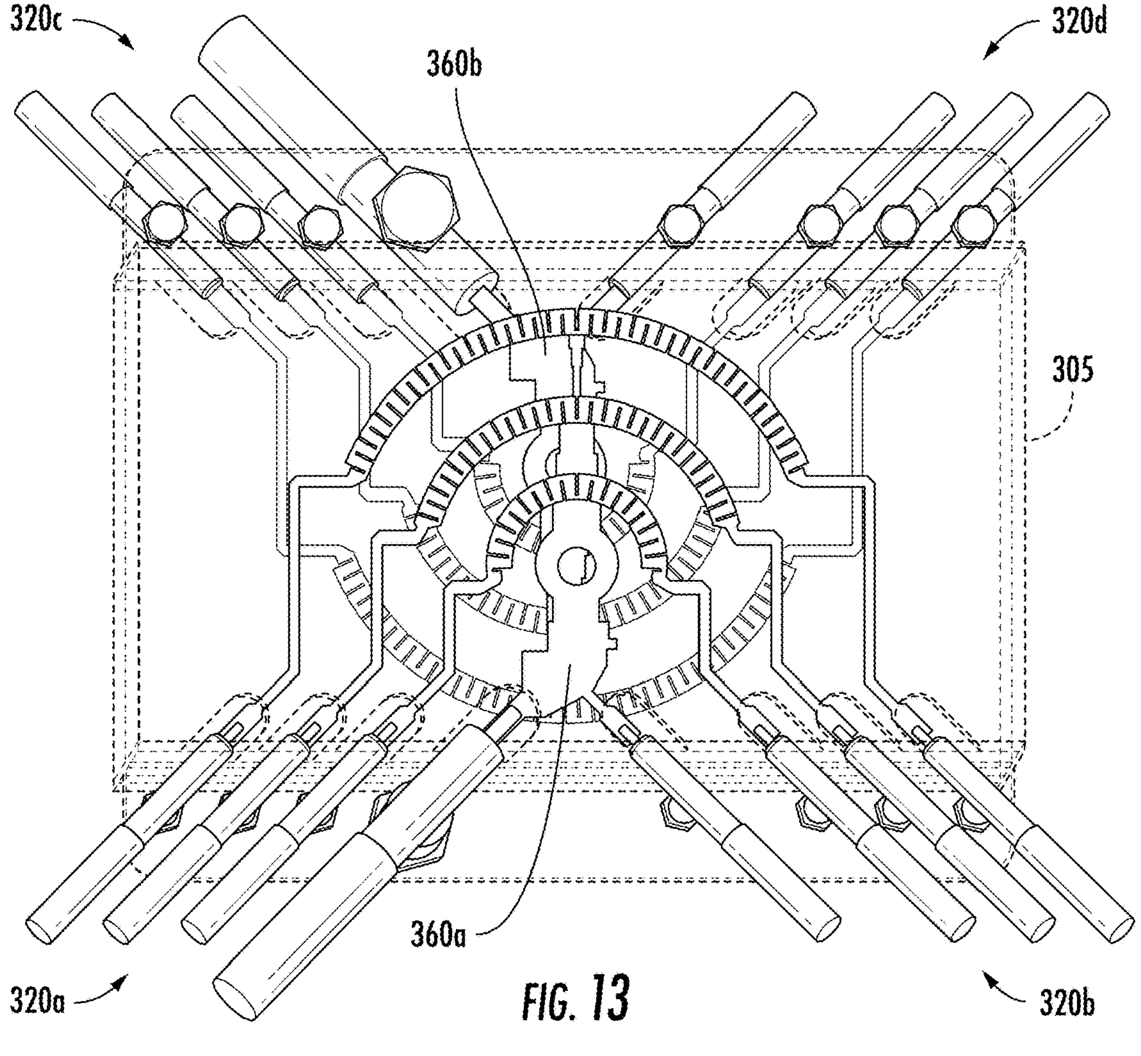
FIG. 13 is a perspective diagram that shows a pair of wiper-type phase shifters of the type shown in FIG. 10 within the housing according to some embodiments of the inventive concept.

FIG. 13 is a perspective diagram that shows a pair of wiper-type phase shifters 360*a*, 360*b* of the type shown in FIG. 10 within the housing according to some embodiments of the inventive concept. As shown in FIG. 13, two wiper-type phase shifters 360*a*, 360*b* can be configured as mirror images of each other within the housing 305.

Figure 14:
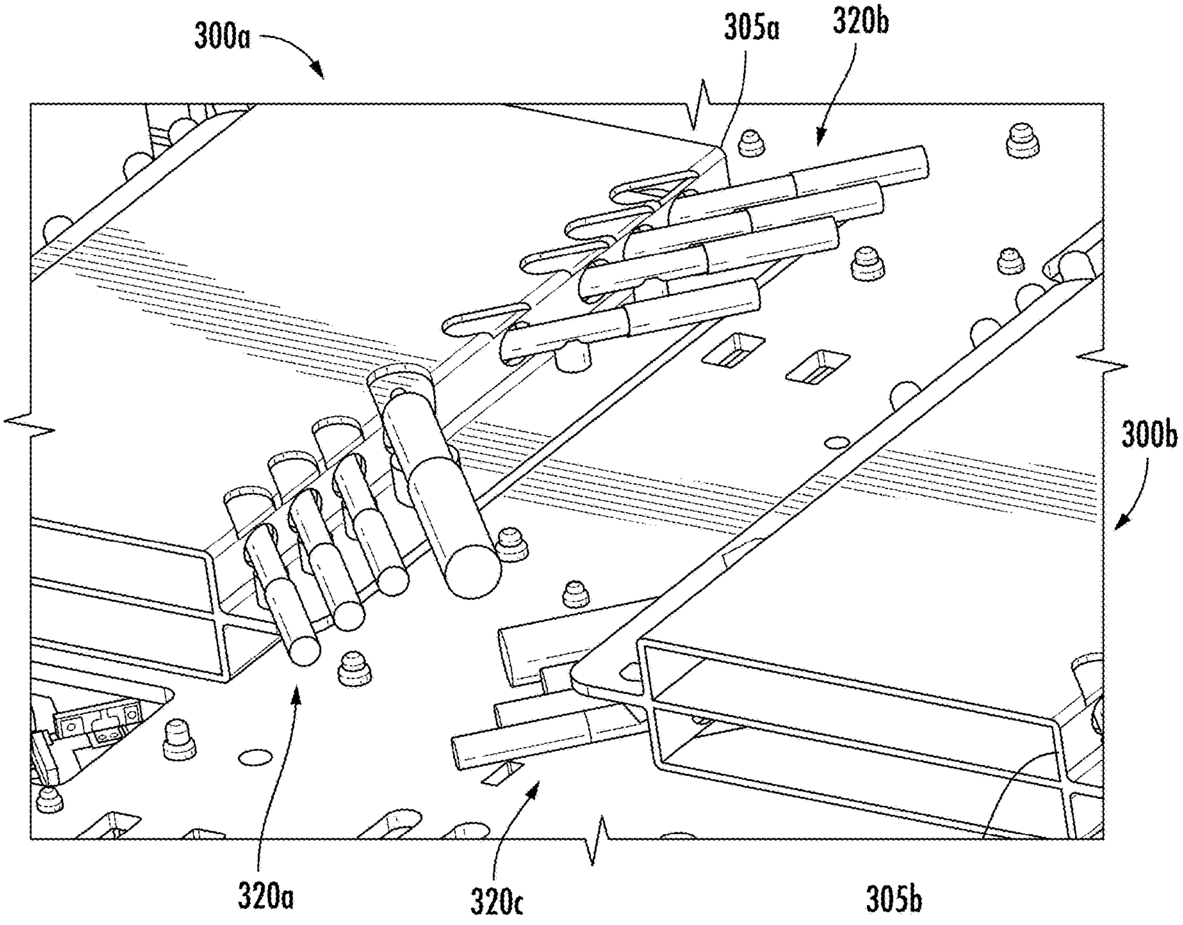
FIG. 14 is a perspective diagram that illustrates arrangements of stripline wiper-type phase shifters of the types shown in FIGS. 10 and 13 in an antenna assembly according to some embodiments of the inventive concept.

FIG. 14 is a perspective diagram that illustrates arrangements of stripline wiper-type phase shifters of the types shown in FIGS. 10 and 13 in an antenna assembly according to some embodiments of the inventive concept. In some embodiments, an antenna assembly of the type described above with respect to FIGS. 2 and 3 may use stripline wiper-type phase shifters 300*a* and 300*b* that are configured as shown. The stripline wiper-type phase shifters 300*a* and 300*b* are configured as shown in FIG. 13 with two wiper-type phase shifters configured as mirror images of each other within the housings 305*a* and 305*b*. Because of this, the cables 320*a* and 320*b* extending from the stripline wiper-type phase shifter 300*a* may extend from an upper portion of the housing 305*a* while the cables 320*c* and 320*d* (not shown) extending from the stripline wiper-type phase shifter 300*b* may extend from a lower portion of the housing 305*b*. This may allow the stripline wiper-type phase shifters 300*a* and 300*b* to be placed closer to one another without resulting in interference between the cables extending therefrom. While only two stripline wiper-type phase shifters 300*a* and 300*b* are shown in FIG. 14, it will be understood that more or fewer stripline wiper-type phase shifters may be used in an antenna assembly in accordance with different embodiments of the inventive concept.

Figure 15:
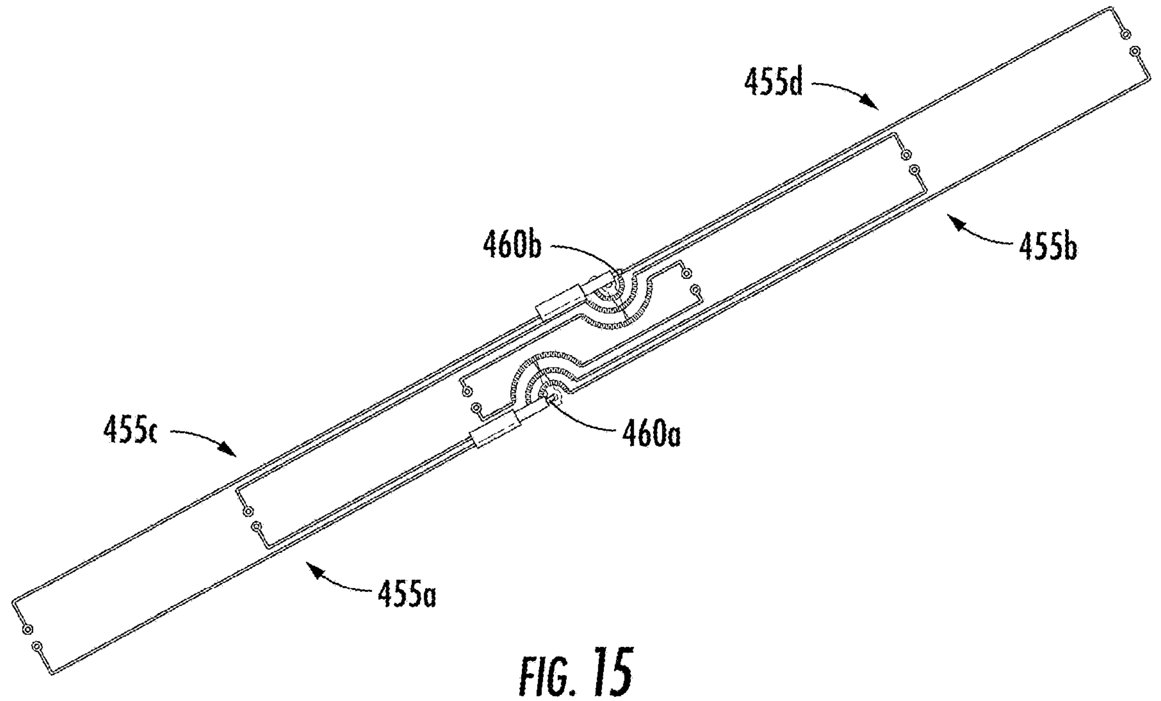
FIG. 15 is a plan view of a stripline wiper-type phase shifter of the type similar to that shown in FIGS. 4 and 7 with extended conductive lines according to some embodiments of the inventive concept.

Phase shifter circuits are typically connected to an antenna feed board using coaxial cables. Such connection may require multiple solder points, which may increase the risk for passive inter-modulation (PIM) interference. FIG. 15 is a plan view of a stripline wiper-type phase shifter of the type similar to that shown in FIGS. 4 and 7 with extended conductive lines according to some embodiments of the inventive concept. Referring to FIG. 15, two wiper-type phase shifters 460*a*, 460*b* may be placed adjacent one another inside of a housing between two ground planes and surrounded by a dielectric. The housing and dielectric are not shown in FIG. 15 to better illustrate the arrangement of the conductive lines associated with the wiper-type phase shifters 460*a*, 460*b*. Specifically, the first wiper-type phase shifter 460*a* is electrically coupled to a first plurality of conductive lines 455*a* and a second plurality of conductive lines 455*b*. Similarly, the second wiper-type phase shifter 460*b* is electrically coupled to a third plurality of conductive lines 455*c* and a fourth plurality of conductive lines 455*d*. The first, second, third, and fourth pluralities of conductive lines 455*a*, 455*b*, 455*c*, and 455*d* may be configured such that the individual conductors have lengths so as to align the terminal ends thereof with individual connection points, respectively, on an antenna feed board or reflector. Thus, rather than use coaxial cables or other type of transmission media, stripline conductive lines may be used between wiper-type phase shifters and the antenna feed points on a feed board or reflector.

Figure 16:
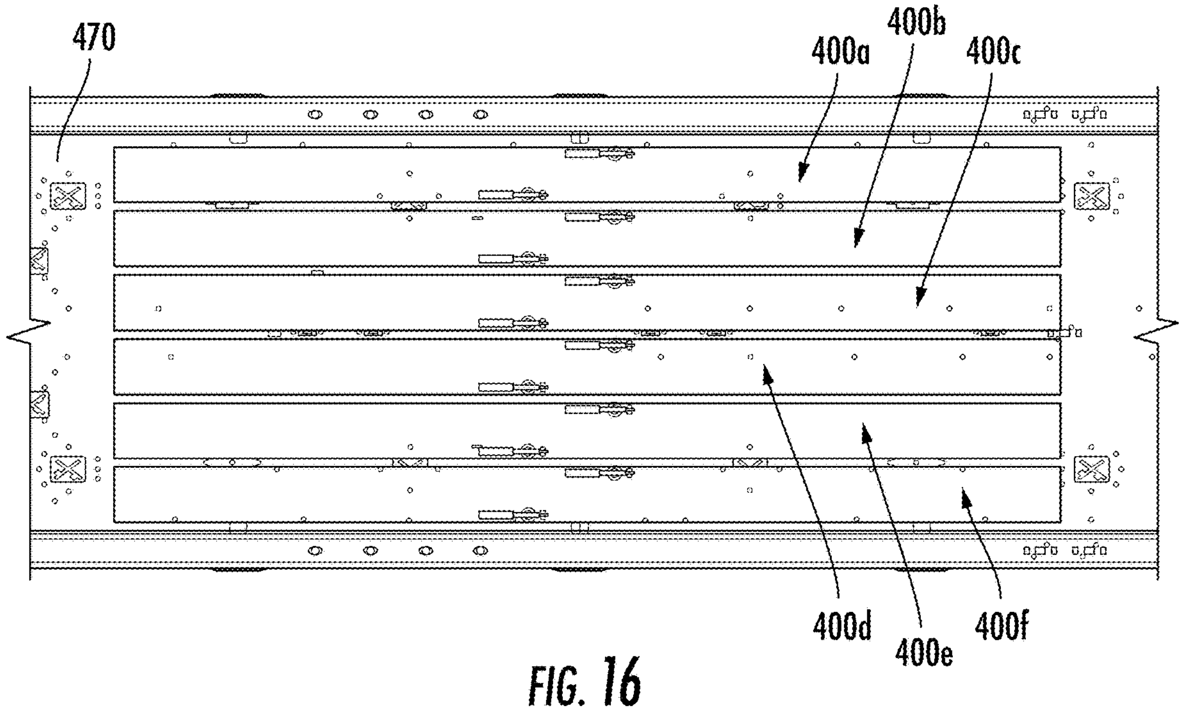
FIG. 16 is a plan view of the stripline wiper-type phase shifter of FIG. 15 coupled to an antenna feed board in accordance with some embodiments of the inventive concept.

FIG. 16 is a plan view of the stripline wiper-type phase shifter of FIG. 15 coupled to an antenna feed board in accordance with some embodiments of the inventive concept. FIG. 16 illustrates six stripline wiper-type phase shifters 400*a*, 400*b*, 400*c*, 400*d*, 400*e*, and 400*f* enclosed in respective housings coupled to an antenna feed board 470 so as to align the terminal points of the stripline conductive lines with various connection points, respectively, on the antenna feed board 470.

Embodiments of stripline wiper-type phase shifters described herein may provide improved insertion loss as compared to conventional PCB based designs thereby improving antenna gain. Moreover, the stripline wiper-type phase shifters may be configured in a variety of different orientations to provide flexibility in cable routing. For example, all cables associated with a wiper-type phase shifter may be routed out of one side of the housing or, in other embodiments, the cables associated with a wiper-type phase shifter may be divided with some cables being routed out of one side of the housing and other cables being routed out of another side of the housing. The routing of conductive lines that are electrically coupled to a wiper-type phase shifter may also be varied to adjust the length of the conductive lines through the dielectric. To vary the electrical performance, the wiper-type phase shifter and/or the conductive lines may be positioned closer to one ground plane versus another, different types of dielectrics can be used, and/or different types of dielectrics can be used between one ground plane and the conductive elements and another ground plane and the conductive elements. Stripline conductive lines may also be extended so that their terminal ends align with connection points on an antenna feed board, which may allow for reduced usage of coaxial cables or other types of cables to make these connections.

FURTHER DEFINITIONS AND EMBODIMENTS

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive subject matter.

It will be understood that when an element is referred to as being "on", "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described to best explain the principles of the disclosure and the practical application, and to enable others of ordinary skill in the art to understand the disclosure with various modifications as are suited to the particular use contemplated.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed is:

1. An apparatus, comprising:

a housing comprising a first ground plane surface and a second ground plane surface; and a wiper-type phase shifter within the housing that is electrically coupled to a first plurality of conductive lines and a second plurality of conductive lines, the housing including air gaps that extend from the wiper-type phase shifter, the first plurality of conductive lines, and the second plurality of conductive lines to the first ground plane surface and to the second ground plane surface, respectively;

wherein the first ground plane surface comprises a first plurality of openings formed therein associated with the first plurality of conductive lines, respectively; and wherein the first ground plane surface comprises a second plurality of openings formed therein associated with the second plurality of conductive lines, respectively;

further comprising:

a first plurality of cables electrically coupled to the first plurality of conductive lines at a first plurality of connection points, respectively, the first plurality of connection points being exposed by the first plurality of openings; and a second plurality of cables electrically coupled to the second plurality of conductive lines at a second plurality of connection points, respectively, the second plurality of connection points being exposed by the second plurality of openings;

wherein the first plurality of cables comprises a first plurality of inner conductors and a first plurality of outer conductors, respectively;

wherein the second plurality of cables comprises a second plurality of inner conductors and a second plurality of outer conductors, respectively;

wherein the first plurality of inner conductors are electrically coupled to the first plurality of conductive lines at the first plurality of connection points, respectively;

wherein the second plurality of inner conductors are electrically coupled to the second plurality of conductive lines at the second plurality of connection points, respectively;

wherein the first plurality of outer conductors are electrically coupled to the housing;

wherein the second plurality of outer conductors are electrically coupled to the housing;

wherein the housing comprises a first plurality of self-clinching pins and a second plurality of self-clinching pins;

wherein the first plurality of outer conductors are electrically coupled to the first plurality of self-clinching pins, respectively; and wherein the second plurality of outer conductors are electrically coupled to the second plurality of self-clinching pins, respectively.

2. The apparatus of claim 1, wherein the first plurality of cables are electrically coupled to the first plurality of conductive lines through a first side of the housing; and wherein the second plurality of cables are electrically coupled to the second plurality of conductive lines through a second side of the housing.

3. The apparatus of claim 2, wherein the housing comprises a first flange that extends from the first side, the first flange being configured to receive the first plurality of self-clinching pins; and wherein the housing comprises a second flange that extends from the second side, the second flange being configured to receive the second plurality of self-clinching pins.

4. The apparatus of claim 3, wherein the first plurality of cables extend at a first angle that is perpendicular with respect to the first side of the housing; and wherein the second plurality of cables extend at a second angle that is perpendicular with respect to the second side of the housing.

5. The apparatus of claim 1, wherein the first plurality of cables and the second plurality of cables are electrically coupled to the first plurality of conductive lines and the second plurality of conductive lines, respectively, through a side of the housing.

6. The apparatus of claim 5, wherein the housing comprises a flange that extends from the side, the flange being configured to receive the first plurality of self-clinching pins and the second plurality of self-clinching pins.

7. The apparatus of claim 6, wherein the first plurality of cables extend at a first oblique angle with respect to the side of the housing in a first direction;

wherein the second plurality of cables extend at a second oblique angle with respect to the side of the housing in a second direction; and wherein the first and second directions do not intersect.

8. The apparatus of claim 1, wherein the wiper-type phase shifter is a first wiper-type phase shifter;

wherein the housing further comprises a third ground plane surface, the second ground plane surface being between the first ground plane surface and the third ground plane surface; and wherein the apparatus further comprises:

a second wiper-type phase shifter within the housing that is electrically coupled to a third plurality of conductive lines and a fourth plurality of conductive lines, the second wiper-type phase shifter, the third plurality of conductive lines, and the fourth plurality of conductive lines being separated from the third ground plane surface and the second ground plane surface by a dielectric material.

9. The apparatus of claim 8, wherein the third ground plane surface comprises a third plurality of openings formed therein associated with the third plurality of conductive lines, respectively; and wherein the third ground plane surface comprises a fourth plurality of openings formed therein associated with the fourth plurality of conductive lines, respectively.

10. The apparatus of claim 1, wherein the wiper-type phase shifter is a first wiper-type phase shifter;

wherein the housing further comprises a third ground plane surface, the second ground plane surface being between the first ground plane surface and the third ground plane surface.

11. The apparatus of claim 10, wherein the apparatus further comprises:

a second wiper-type phase shifter within the housing that is electrically coupled to a third plurality of conductive lines and a fourth plurality of conductive lines, the second wiper-type phase shifter, the third plurality of conductive lines, and the fourth plurality of conductive lines being separated from the third ground plane surface and the second ground plane surface by a dielectric material.

12. The apparatus of claim 1, wherein the first plurality of conductive lines extend a first plurality of lengths, respectively, within the housing such that terminal ends of the first plurality of conductive lines are configured to align with first connection points for an antenna feed board, respectively; and wherein the second plurality of conductive lines extend a second plurality of lengths, respectively, within the housing such that terminal ends of the second plurality of conductive lines are configured to align with second connection points for the antenna feed board, respectively.

13. An antenna assembly, comprising:

a plurality of radiating elements; and a feed network coupled to the plurality of radiating elements, the feed network comprising a plurality of phase shifters, each of the plurality of phase shifters comprising:

a housing comprising a first ground plane surface, a second ground plane surface, a third ground plane surface, the second ground plane surface being between the first ground plane surface and the third ground plane surface, and a plurality of self-clinching pins;

a first wiper-type phase shifter within the housing that is electrically coupled to a first plurality of conductive lines and a second plurality of conductive lines, the first wiper-type phase shifter, the first plurality of conductive lines, and the second plurality of conductive lines being separated from the first ground plane surface and the second ground plane surface by a dielectric material;

a second wiper-type phase shifter within the housing that is electrically coupled to a third plurality of conductive lines and a fourth plurality of conductive lines, the second wiper-type phase shifter, the third plurality of conductive lines, and the fourth plurality of conductive lines being separated from the third ground plane surface and the second ground plane surface by the dielectric material;

a plurality of inner conductors electrically coupled to the first plurality of conductive lines at a first plurality of connection points, respectively; and a plurality of outer conductors electrically coupled to the plurality of self-clinching pins, respectively.

14. An antenna assembly, comprising:

a plurality of radiating elements; and a feed network coupled to the plurality of radiating elements, the feed network comprising a plurality of phase shifters, each of the plurality of phase shifters comprising:

a housing comprising a first ground plane surface, a second ground plane surface, a third ground plane surface, the second ground plane surface being between the first ground plane surface and the third ground plane surface, and a plurality of self-clinching pins;

a first one of the plurality of phase shifters comprising:

a first wiper-type phase shifter within the housing that is electrically coupled to a first plurality of conductive lines and a second plurality of conductive lines, the first wiper-type phase shifter, the first plurality of conductive lines, and the second plurality of conductive lines being separated from the first ground plane surface and the second ground plane surface by a dielectric material; and a second one of the plurality of phase shifters comprising:

a second wiper-type phase shifter within the housing that is electrically coupled to a third plurality of conductive lines and a fourth plurality of conductive lines, the housing including air gaps that extend from the second wiper-type phase shifter, the third plurality of conductive lines, and the fourth plurality of conductive lines to the third ground plane surface and to the second ground plane surface, respectively;

a plurality of inner conductors electrically coupled to the first plurality of conductive lines at a first plurality of connection points, respectively; and a plurality of outer conductors electrically coupled to the plurality of self-clinching pins, respectively.

15. The antenna assembly of claim 14, further comprising:

a first plurality of cables electrically coupled to the first plurality of conductive lines, respectively;

a second plurality of cables electrically coupled to the second plurality of conductive lines, respectively;

a third plurality of cables electrically coupled to the third plurality of conductive lines, respectively; and a fourth plurality of cables electrically coupled to the fourth plurality of conductive lines, respectively;

wherein the first one of the plurality of phase shifters and the second one of the plurality of phase shifters are arranged adjacent one another in a direction that is substantially parallel with planes defined by the first, second, and third ground plane surfaces, respectively; and wherein the first plurality of cables and the second plurality of cables extend from a first side of the housing of the first one of the plurality of phase shifters;

wherein the third plurality of cables and the fourth plurality of cables extend from a second side of the housing of the second one of the plurality of phase shifters; and wherein the first side of the housing of the first one of the plurality of phase shifters faces the second side of the housing of the second one of the plurality of phase shifters.

* * * * *